(12) United States Patent
Tsay et al.

(10) Patent No.: US 8,721,763 B2
(45) Date of Patent: May 13, 2014

(54) METHOD FOR SEPARATING METAL NANOPARTICLES FROM COLLOIDAL METAL SOLUTION

(75) Inventors: Ming-Tseh Tsay, Taoyuan County (TW); Seng-Min Chang, Taoyuan County (TW)

(73) Assignee: Chung Shan Institute of Science and Technology, Taoyuan County (TW)

( * ) Notice: Subject to any disclaimer, the term of this patent is extended or adjusted under 35 U.S.C. 154(b) by 77 days.

(21) Appl. No.: 13/564,464

(22) Filed: Aug. 1, 2012

(65) Prior Publication Data

US 2014/0033870 A1 Feb. 6, 2014

(51) Int. Cl.
| | | |
|---|---|---|
| B22F 1/00 | (2006.01) | |
| B22F 9/16 | (2006.01) | |
| C22B 3/44 | (2006.01) | |
| B82Y 40/00 | (2011.01) | |
| C22B 15/00 | (2006.01) | |

(52) U.S. Cl.
CPC ............... *B22F 1/0018* (2013.01); *B22F 9/16* (2013.01); *C22B 3/44* (2013.01); *C22B 15/0089* (2013.01); *B82Y 40/00* (2013.01); *Y10S 977/773* (2013.01); *Y10S 977/81* (2013.01)
USPC ................ 75/371; 75/373; 977/773; 977/810

(58) Field of Classification Search
CPC ...... B22F 1/0018; B22F 9/16; B22F 2009/16; C22B 3/44; C22B 15/0089; B82Y 40/00
USPC .............................. 75/371, 373; 977/810, 773
See application file for complete search history.

(56) References Cited

U.S. PATENT DOCUMENTS

| | | | |
|---|---|---|---|
| 7,270,694 B2 | 9/2007 | Li et al. | |
| 7,329,301 B2 | 2/2008 | Chang et al. | |
| 7,575,621 B2 * | 8/2009 | Vanheusden et al. | ........... 75/351 |
| 7,591,872 B1 | 9/2009 | Jun et al. | |
| 2005/0235776 A1 * | 10/2005 | He et al. | ......................... 75/255 |
| 2006/0084705 A1 * | 4/2006 | Caruso et al. | ................... 516/20 |

FOREIGN PATENT DOCUMENTS

| | | |
|---|---|---|
| TW | I250969 | 3/2006 |
| TW | I337892 | 3/2011 |

\* cited by examiner

*Primary Examiner* — George Wyszomierski
*Assistant Examiner* — Tima M McGuthry Banks
(74) *Attorney, Agent, or Firm* — Morris Manning & Martin LLP; Tim Tingkang Xia, Esq.

(57) ABSTRACT

A method for separating metal nanoparticles from colloidal metal solution includes providing a colloidal metal solution, including a plurality of metal nanoparticles; mixing a precipitating agent with the colloidal metal solution for maintaining the power of hydrogen value (pH) of the colloidal metal solution in a specific value; keeping the colloidal metal solution stationary for a static time at an environmental temperature such that the metal nanoparticle precipitates from the colloidal metal solution, and the colloidal metal solution forms a supernatant and a precipitating liquid; separating a precipitate from the precipitating liquid by a filtering process; and liquid blasting the precipitate by a first solvent to obtain the metal nanoparticles.

21 Claims, 1 Drawing Sheet

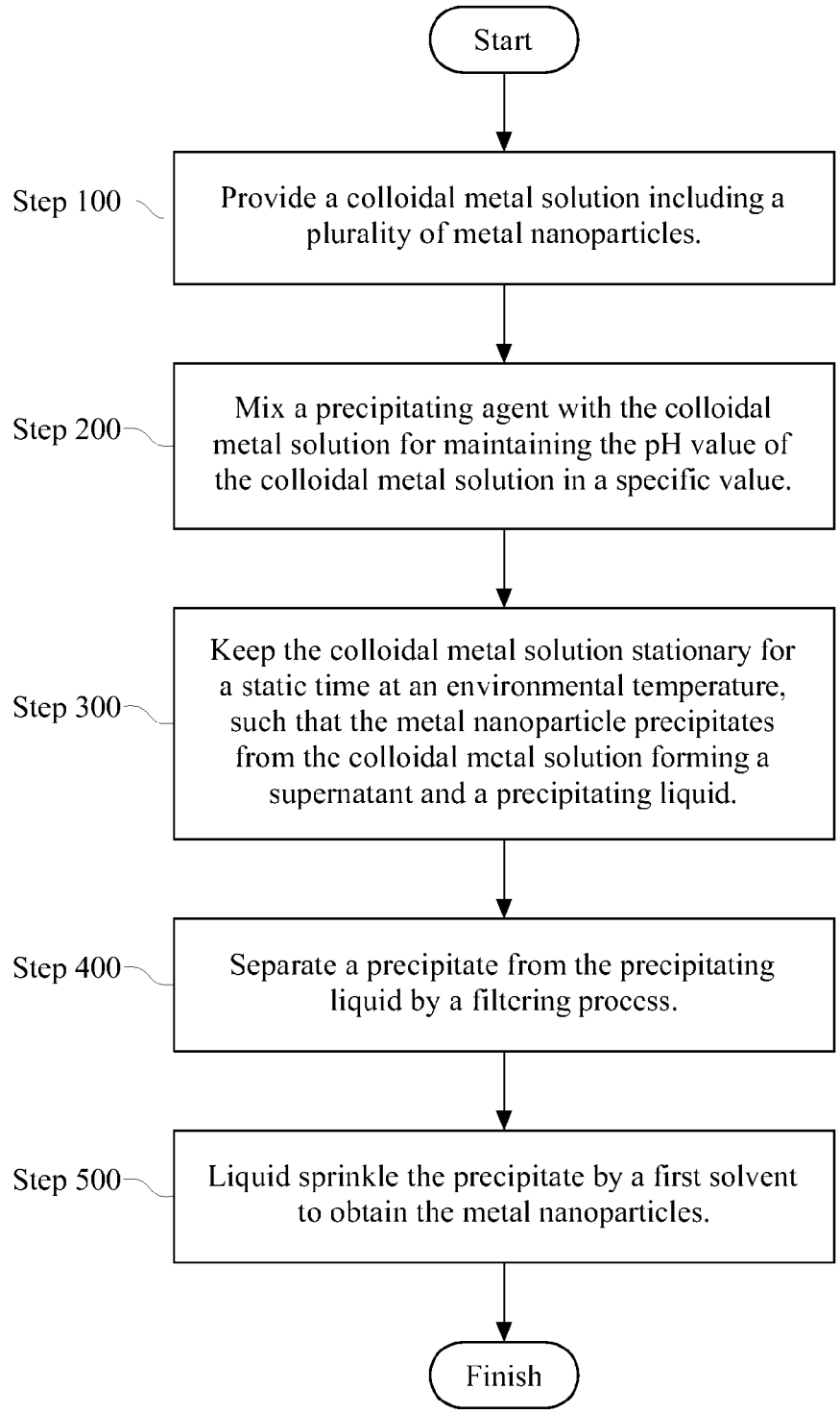

METHOD FOR SEPARATING METAL NANOPARTICLES FROM COLLOIDAL METAL SOLUTION

BACKGROUND

1. Technical Field

The present disclosure relates to a method for separating, and more particularly to a method for separating metal nanoparticles from a colloidal metal solution.

2. Related Art

In recent years, metal nanoparticles, which becomes a new functional material with advantages of high specific area, high activity and low melting point, are applicable to electronic ceramic material, catalyst, photosensitive material, electrical contact material, hybrid material, alloy solder, low-temperature-thermal-conductive material and electrical conductive ink.

Take nanosilver (nano-Ag) for example. Preparation methods of nano-Ag particles comprise a physical method and a chemical method. The physical method is that thinning a bulk material by a mechanical force so that the particle diameter of the material is reduced to a required particle diameter. But the disadvantage of the physical method is that it is uneasy to obtain a particle with a diameter less than 100 nanometers (nm). The chemical method includes a wet chemical reduction process, a photochemical conversion process, an electrochemical process and an ultrasonic chemical process. The above-mentioned process may obtain the particles with the diameter less than 100 nm. Because of advantages of simple processing and easy operation, the wet chemical reduction process is generally adopted so far.

Although the wet chemical reduction process is generally used in laboratories and industries, colloidal nano-Ag solution formed in the wet chemical reduction process comprises a large number of impurities so that the colloidal nano-Ag solution cannot be the final product used in some applications directly. Moreover, in other applications, the nano-Ag particles are required to be a dry-powder type (the particles must be dried and small). Therefore, the nano-Ag particles must be further separated from the colloidal nano-Ag solution formed by the wet chemical reduction process so that the nano-Ag particles may be used in some applications. However, the nano-Ag particles are small with high surface energy and are electrically charged and a surfactant exists on the surface of the nano-Ag particles so that the nano-Ag particles may be stably dispersed in a liquid phase and the separation method may not be applied to separate the nano-Ag particles.

In a method for solid-liquid separation of the colloidal nano-Ag solution, only a high-speed centrifugal technology (the rotation speed of a centrifugal machine is greater than 8000 rotations per minute (rpm)) can be applied to separate the nano-Ag particles from the colloidal nano-Ag solution well. However, in the method for solid-liquid separation of the colloidal nano-Ag solution, equipment function and safety are highly required, the cost is high, and the productivity is low, so that the production cost may not be reduced and the powdered nano-Ag particles may not be formed in mass production. Further, the product of the nano-Ag particles taken out from a centrifugal bottle of the centrifugal machine is hard to be operated, and the nano-Ag particles are agglomerated seriously after the centrifugal solid-liquid separation and are hard to be separated from each other again. Therefore, how to separate the nano-Ag particles from the colloidal nano-Ag solution is a problem needs to be solved.

In Taiwan patent number TWI250969, a nano-Ag composition is disclosed. The nano-Ag composition may be continuously stabled with diameters less than 100 nm. A colloidal nano-Ag solution is dissolved in ammonia with silver oxide and mixes with a protective agent and hydrazine ($NH_2NH_2 \cdot H_2O$). Nano-Ag particles obtained by a liquid-phase chemical reduction reaction on the colloidal nano-Ag solution may include impurities, such as unreacted composition or precursors. If the solid-liquid separation is not performed on the nano-Ag particles, impurity pollution occurs in the nano-Ag particles.

In Taiwan patent number TWI337892, a method for obtaining high-concentration colloidal nano-Ag solution is disclosed. The chemical materials comprise sodium dodecyl sulphate (SDS), polyvinyl pyrollidone (PVP), polyvinyl alcohol (PVA), sodium borohydride, hydrazine, formaldehyde, glucose, sodium citrate and sodium hydroxide. Although the above-mentioned method may obtain the colloidal nano-Ag solution with weight percent (wt. %) of 1.5 and an average diameters of 10 nm, the colloidal nano-Ag solution may contain excess unreacted reagent and high-concentration impurities (such as, sodium ions or acid ions) or toxic substance (such as, formaldehyde). When the excess unreacted reagent and high-concentration impurities may not be separated from the colloidal nano-Ag solution, applications of the colloidal nano-Ag solution may be limited.

Moreover, in U.S. Pat. No. 7,329,301, U.S. Pat. No. 7,270,694 and U.S. Pat. No. 7,591,872, these nano-Ag particles are obtained by performing wet chemical reduction processes. The above-mentioned methods may be applied with using some kinds of reducing agents, protective agents, solvents and chelating agents. With moderate reaction temperature and sufficient stir, high productivity of the nano-Ag particles is achieved. However, these patent descriptions does not discuss about the following separation between the nano-Ag particles and the colloidal nano-Ag solutions.

To sum up, the technological industry of forming nano-Ag, nanosilver/copper (nano-Ag/Cu) and nanocopper (nano-Cu) needs a low-cost, high-efficiency and improving method for separating metal nanoparticles from a colloidal metal solution.

SUMMARY

A method for separating metal nanoparticles from colloidal metal solution, comprises providing a colloidal metal solution including a plurality of metal nanoparticles; mixing a precipitating agent with the colloidal metal solution for maintaining the pH of the colloidal metal solution in a specific value; keeping the colloidal metal solution stationary for a static time at an environmental temperature such that the metal nanoparticle precipitates from the colloidal metal solution, and the colloidal metal solution forms a supernatant and a precipitating liquid; separating a precipitate from the precipitating liquid by a filtering process; and liquid sprinkling the precipitate by a first solvent to obtain the metal nanoparticles.

BRIEF DESCRIPTION OF THE DRAWINGS

The present disclosure will become more fully understood from the detailed description given herein below for illustration only, and thus are not limitative of the present disclosure, and wherein:

FIG. 1 is a flow chart of a method for separating metal nanoparticles from colloidal metal solution according to a first embodiment.

DETAILED DESCRIPTION

Please refer to FIG. 1, which is a flow chart of a method for separating metal nanoparticles from colloidal metal solution according to a first embodiment.

First, in Step 100, a colloidal metal solution is provided. The colloidal metal solution includes a plurality of metal nanoparticles. The colloidal metal solution is selected from a group consisting of a nano-Ag solution, a colloidal nano-Ag/Cu solution and a colloidal nano-Cu solution. Moreover, the colloidal metal solution is obtained by a wet chemical reduction process technology. The steps of the wet chemical reduction process comprise mixing a reduction agent, a surfactant, a pH adjustor and a metal salt with a second solvent. The second solvent is selected from a group consisting of water, methanol, ethanol, propanol, butanol, ethylene glycol and acetone. The reduction agent is selected from a group consisting of formaldehyde (HCHO), sodium hypophosphite ($NaH_2PO_2 \cdot H_2O$), hydrazine ($N_2H_4 \cdot H_2O$), sodium borohydride ($NaBH_4$), glucose ($C_6H_{12}O_6$), ascorbic acid ($C_6H_8O_6$) and sodium citrate ($C_6H_5O_7Na_3 \cdot 2H_2O$). The surfactant is selected from a group consisting of polyvinylpyrrolidone (PVP), sodium dodecyle sulfate (SDS), polyvinyl alcohol (PVA) and cetyltrimethylammonium bromide (CTAB). The pH adjustor is selected from a group consisting of sodium hydroxide, potassium hydroxide, ammonia, sulfuric acid and hydrochloric acid. The metal salt is selected from a group consisting of silver nitrate, silver acetate, copper nitrate, copper sulfate and copper acetate. After that, the colloidal metal solution is sufficiently stirred below 100 degrees Celsius (° C.) by an ultrasonic vibrator or a homogenizer to finish the wet reduction process such that the colloidal metal solution with diameters less than 100 nm is obtained. In one embodiment, after the wet chemical reduction process is performed, the second solvent includes not only the metal nanoparticles but also impurities, such as excess unreacted reagent, electrolyte, acid ions, sodium or potassium ions. Therefore, such impurities still need to be removed so that the high-purity metal nanoparticles may be obtained.

Afterwards, in Step 200, a precipitating agent is mixed with the colloidal metal solution such that the pH of the colloidal metal solution is maintained in a specific value. In this embodiment, the precipitating agent is dripped down the colloidal metal solution gradually and the colloidal metal solution is sufficiently stirred to disperse the precipitating agent uniformly. Until the measured pH value of the colloidal metal solution is between 2 and 6, the dripping of the precipitating agent may be stopped.

The above-mentioned precipitating agent is a third solvent including a compound. The compound is dissolved in the third solvent and is selected from the group consisting of methylamine ($CH_3NH_2$), ethylamine ($CH_3CH_2NH_2$), aminoethanol ($H_2N(CH_2)_2OH$), ethylenediamine ($C_2H_4(NH_2)_2$), dimethylamine ($(CH_3)_2NH$), trimethylamine ($N(CH_3)_3$), triethylamine ($(C_2H_5)_3N$), propylamine ($C_3H_7NH_2$), isopropylamine ($i$-$C_3H_7NH_2$), 1,3-propylenediamine ($NH_2(CH_2)_3NH_2$), 1,2-propylenediamine ($CH_3CH(NH_2CH_2NH_2)$), tripropylamine ($(CH_3CH_2CH_2)_3N$), triethanolamine ($(HOCH_2CH_2)_3N$), butylamine ($C_4H_9NH_2$), isobutylamine ($C_4H_9NH_2$), tert-butylamine ($C_4H_9NH_2$), n-hexylamine ($H(CH_2)_6NH_2$), n-Octylamine ($H(CH_2)_8NH_2$), benzeneamine ($C_6H_5NH_2$), benzylamine ($C_7H_9N$), pyridine ($C_5H_5N$), polyacrylamide ($[-C_3H_5NO-]_n$), polyacrylic acid ($[-C_3H_4O_2-]_n$), sodium polyacrylate ($[-CH_2-CH(COONa)-]_n$), and combinations thereof. The third solvent may be water, methanol, ethanol, propanol, butanol, ethylene glycol or acetone.

Next, in Step 300, the colloidal metal solution is kept stationary for a static time at an environmental temperature such that the metal nanoparticles precipitate from the colloidal metal solution, and the colloidal metal solution forms a supernatant and a precipitating liquid. In this embodiment, under the condition that the environmental temperature is at a range of 15 to 35° C. and the static time is less than or equal to 48 hours, the metal nanoparticles generate soft agglomerations and are precipitated gradually by performing adhesion, bridging and cross-linking reaction with each other until the supernatant and the precipitating liquid are divided obviously. After that, the supernatant is removed by a decantation process or a suction process such that the precipitating liquid having the metal nanoparticles with soft agglomerations is retained.

After that, in Step 400, a precipitate is separated from the precipitating liquid by a filtering process. The filtering process is to separate the precipitate by a vacuum filtration or a gravity filtration. In this embodiment, the separation using vacuum filtration is implemented for example. The steps of the filtering process using the vacuum filtration separation comprise pouring the precipitating liquid on a flask and reducing the pressure inside the flask to separate the precipitate under the influence of differential pressure and gravity.

Next, in Step 500, the precipitate is liquid sprinkled by a first solvent to obtain the metal nanoparticles. In this embodiment, the first solvent is enabled to liquid sprinkle the precipitate such that dissoluble impurities on the precipitate may be removed to obtain the metal nanoparticles. In this embodiment, the first solvent is selected from a group consisting of water, methanol, ethanol and acetone.

Further, in other embodiments, before the step of obtaining the metal nanoparticles, the method for separating the metal nanoparticles from the colloidal metal solution further comprises drying and powdering the precipitate to obtain the dried metal nanoparticles. The steps of drying the precipitate comprise vacuum drying or natural seasoning.

The present disclosure will become more fully understood from the following embodiments taken as examples for detailed description, but not limited to the following embodiments.

The First Embodiment

First, a first solution is formed. 49 grams (g) of polyvinylpyrrolidone (PVP) with molecular weight of 58,000 is provided to be dissolved in 240 milliliters (ml) of deionized water. Next, 0.96 g of sodium hydroxide and 21.6 g of glucose are mixed with deionized water in sequence. In addition, a second solution is also formed. 10.2 g of silver nitrate is provided to be dissolved in another 120 ml of deionized water. Then, 48 g of urea is mixed with the deionized water. The first and second solutions are mixed with each other, and then, the mixed solution is stirred sufficiently. After stirring, the mixed solution is immediately moved to a thermostatic bath with 30° C. and is reacted in 60 minutes. That is, a colloidal nano-Ag solution is obtained. The average diameter of the colloidal nano-Ag solution is 52 nm measured by a particle size measurement device (in this embodiment, the particle size measurement device is Malvern (brand name), Zetasizer 3000HS (product name), but is not limited to the above-mentioned device). The colloidal nano-Ag solution includes not only nano-Ag particles but also excess unreacted glucose, PVP and impurities, such as nitrate, hydroxyl and amino, dissolved in the mixed solution. Therefore, the impurities must be removed so that the nano-Ag particles with high purity may be obtained to increase the range of following applications. In this embodiment, in order to achieve the above-mentioned purpose, triethanolamine and polyacrylamide are provided to be main ingredients of each precipitating agent, and the ratio, by volume, of the triethanolamine to the polyacrylamide is 2:1 (each kind of the precipitating agents is shown in table 1). The following steps are described as follows. Each of the precipitating agents is dripped down the above-mentioned colloidal nano-Ag solution, and the colloidal nano-Ag solution is stirred sufficiently to adjust the pH of the colloidal nano-Ag solution to 5.5. After the colloidal nano-Ag solution is kept stationary for 240 minutes, a supernatant is removed. Then, a precipitate is separated from an agglomeration of nano-Ag particles in a precipitating liquid by the vacuum filtration process. In this embodiment, the vacuum filtration is that pumping air out of a flask, and after the pressure in the flask is adjusted to the negative pressure, the precipitating agent is dripped on the flask to make the precipitate separate from the precipitating liquid. Next, the precipitate is liquid sprinkled by ethanol. Then, the high-quality nano-Ag particles are obtained after the precipitate is dried by vacuum drying. The separated nano-Ag particles may be further dispersed in the ethanol by ultrasonic vibration. The average diameters of the nano-Ag particles analyzed by the particle size measurement device are shown in Table 1.

TABLE 1

The average diameters of the nano-Ag particles analyzed by the particle size measurement device.

| example number | weight percent of triethanolamine (wt. %) | weight percent of poly-acrylamide (wt. %) | average diameter of the nano-Ag particles before mixing the precipitating agent (nm) | average diameter of the nano-Ag particles after solid-liquid separation (nm) |
|---|---|---|---|---|
| 1 | 5 | — | 52 | 123 |
| 2 | — | 0.02 | 52 | 65 |
| 3 | 5 | 0.05 | 52 | 64 |
| 4 | 10 | 0.05 | 52 | 69 |
| 5 | 5 | 0.01 | 52 | 72 |
| 6 | 10 | 0.01 | 52 | 80 |

The Second Embodiment

First, a first solution is formed, which is the same as the first embodiment. 49 g of PVP with molecular weight of 58,000 is provided to be dissolved in 240 ml of deionized water. Next, 0.96 g of sodium hydroxide and 21.6 g of glucose are mixed with deionized water in sequence. In addition, a second solution is also formed. 5.1 g of silver nitrate is provided to be dissolved in another 120 ml of deionized water. Then, 48 g of urea is mixed with the deionized water. The first and second solutions are mixed with each other, and the mixed solution is immediately moved to a thermostatic bath with 30° C. and is reacted in 60 minutes. That is, a colloidal nano-Ag solution is obtained. The average diameter of the colloidal nano-Ag solution is 9 nm. The colloidal nano-Ag solution includes not only nano-Ag particles but also excess unreacted glucose, PVP and dissolved impurities, such as nitrate, hydroxyl and amino. Therefore, the impurities must be removed so that the nano-Ag particles with high purity may be obtained to increase the range of following applications. In this embodiment, in order to achieve the above-mentioned purpose, ethylenediamine and polyacrylamide are provided to be main ingredients of a precipitating agent and the ratio, by volume, of the ethylenediamine to the polyacrylamide is 2:1 (each kind of the precipitating agents is shown in table 2). The following steps are described as follows. Each of the precipitating agents is dripped down the above-mentioned colloidal nano-Ag solution and the colloidal nano-Ag solution is stirred sufficiently to adjust the pH of the colloidal nano-Ag solution to 5.5. After the colloidal nano-Ag solution is kept stationary for 240 minutes, a supernatant is removed. Then, a precipitate is separated from an agglomeration of the nano-Ag particles in a precipitating liquid by the vacuum filtration process. In this embodiment, the vacuum filtration is that pumping air out of a flask, and after the pressure in the flask is the negative pressure, the precipitating agent is dripped on the flask to make the precipitate separate from the precipitating liquid. Next, the precipitate is liquid sprinkled by ethanol. Then, the high-quality nano-Ag particles are obtained after the precipitate is dried by vacuum drying. The separated nano-Ag particles may be further dispersed in the ethanol by ultrasonic vibration. The average diameters of the nano-Ag particles analyzed by the particle size measurement device are shown in Table 2.

TABLE 2

The average diameters of the nano-Ag particles analyzed by the particle size measurement device.

| example number | weight percent of ethyl-enediamine (wt. %) | weight percent of poly-acrylamide (wt. %) | average diameter of the nano-Ag particles before mixing with the precipitating agent (nm) | average diameter of the nano-Ag r particles after performing solid-liquid separation (nm) |
|---|---|---|---|---|
| 1 | 5 | — | 9 | 33 |
| 2 | — | 0.02 | 9 | 13 |
| 4 | 5 | 0.05 | 9 | 12 |
| 5 | 8 | 0.05 | 9 | 16 |
| 6 | 5 | 0.01 | 9 | 15 |
| 7 | 8 | 0.01 | 9 | 19 |

According to the two above-mentioned embodiments, the nano-Ag particles of the colloidal nano-Ag solution may be in a stable state under the condition that the pH and the concentration of electrolyte in the colloidal nano-Ag solution are both maintained in certain ranges, and a surfactant exists in the colloidal nano-Ag solution. But when the electrolyte (alkaline reagent) or a macromolecular polymer is mixed with the colloidal nano-Ag solution, the balance (the stable state) may be broken, and the nano-Ag particles generate agglomeration or flocculation by performing adhesion, bridging and cross-linking reaction with each other. Therefore, the nano-Ag particles may be separated from the colloidal nano-Ag solution when filtering is performed directly.

The reason why mixing with the alkaline reagent to adjust the pH causes the agglomeration of the nano-Ag particles is that the silver particles are positively charged and the alkaline reagent mixed with is negatively charged, so the charge balance of the colloidal nano-Ag solution may be broken, which leads to the agglomeration of the colloidal particles, thereby generating the flocculation. In other words, because there is no polymer chain between the agglomeration of the particles, and redox reaction is still performed between the particles, the (hard type) agglomeration of the particles is generated. However, the agglomerated particles are uneasy to be dispersed uniformly again after being stirred or vibrated. The PVP is taken as a polymer protective agent for enabling the silver particles to float stability by steric hindrance effect and electrostatic effect. The mix of the alkaline reagent may change the adhesion of the PVP to a certain extent so as to reduce the steric protection of the surface of the silver particles, thereby speeding up the agglomeration of the silver particles. In addition, the alkaline reagent may break the electrolyte balance of the solution.

From the test result, it shows that the stable diameters of the silver particles may be obtained when using organic macromolecular polymer (as known as polymer) alone to precipitate the silver particles. This is because the nano-Ag particles are attached to the macromolecular polymer, the direct contacts between each of the nano-Ag particles are avoided. But in fact, the precipitation of the nano-Ag particles is not fully completed and the supernatant still has some nano-Ag particles floating, so the excess macromolecular polymer must be mixed with the supernatant so as to make the floating nano-Ag particles in the supernatant precipitate effectively. But the excess macromolecular polymer is undesirable to the upcoming sprinkling and separation which leads to reduce the purity of the final product. Therefore, the addition amount of the organic macromolecular polymer may be reduced.

Further, although the use of the organic alkaline reagent may completely enable the nano-Ag particles to be precipitated, a side effect happens that the silver particles is agglomerated easily, thereby forming the nano-Ag particles with greater diameters. Furthermore, the use of the organic alkaline reagent and the macromolecular polymer are not reacted with each other. Thus, in other embodiments, the organic alkaline reagent and the macromolecular polymer may be taken as the precipitating agent.

From the test result, the precipitating agent mixing with the organic alkaline reagent and the macromolecular polymer may enable the silver particles to be precipitated effectively. Therefore, the nano-Ag particles may be separated by applying the vacuum filtration.

Moreover, by applying the vacuum filtration, only a small amount of the mixed solution is needed for separating the precipitated nano-Ag particles. Also, the agglomeration of the nano-Ag particles may be reduced.

The Third Embodiment

First, a first solution is formed by a copper sulfate solution. An adequate amount of copper sulfate is provided to form the 250 ml copper sulfate solution with 0.1 mol/L (liter). Next, a second solution is formed by a sodium hypophosphite solution. 20 g of PVP with molecular weight of 58,000 is provided to be dissolved in 150 ml of deionized water. Next, 25 g of the sodium hypophosphite is mixed with the deionized water. The first and second solutions are mixed with each other, and then, the mixed solution is stirred sufficiently. Next, the mixed solution is immediately moved to a thermostatic bath with 95° C. and is reacted in 60 minutes. That is, a colloidal nano-Cu solution is obtained. The average diameter of the colloidal nano-Cu solution is 85 nm measured by the particle size measurement device (in this embodiment, the particle size measurement device is Malvern (brand name), Zetasizer 3000HS (product name), but is not limited to the above-mentioned device). The colloidal nano-Cu solution includes not only nano-Cu particles but also excess unreacted sodium hypophosphite, PVP and dissolved impurities, such as sulfate. Therefore, the impurities must be removed so that the nano-Cu particles with high purity may be obtained to increase the range of following applications. In this embodiment, in order to achieve the above-mentioned purpose, ethylamine and polyacrylamide are provided to be main ingredients of each precipitating agent and the ratio, by volume, of the ethylamine to the polyacrylamide is 2:1 (each kind of the precipitating agents is shown in table 3). The following steps are described as follows. Each of the precipitating agents is dripped down the above-mentioned colloidal nano-Cu solution and the colloidal nano-Cu solution is stirred sufficiently to adjust the pH of the colloidal nano-Cu solution to 5. After the colloidal nano-Cu solution is kept stationary for 240 minutes, a supernatant is removed. Then, a precipitate is separated from an agglomeration of the nano-Cu particles in a precipitating liquid by the vacuum filtration process. In this embodiment, the vacuum filtration is that pumping air out of a flask, and after the pressure in the flask is adjusted to the negative pressure, the precipitating agent is dripped on the flask to make the precipitate separate from the precipitating liquid. Next, the precipitate is liquid sprinkled by ethanol. Then, the high-quality nano-Cu particles are obtained after the precipitate is dried by vacuum drying. The separated nano-Cu particles may be further dispersed in the ethanol by ultrasonic vibration. The average diameters of the nano-Cu particles analyzed by the particle size measurement device are shown in Table 3.

TABLE 3

The average diameters of the nano-Cu particles analyzed by the particle size measurement device.

| example number | weight percent of ethylamine (wt. %) | weight percent of poly-acrylamide (wt. %) | average diameter of the nano-Cu particles before mixing with the precipitating agent (nm) | average diameter of the nano-Cu particles after performing solid-liquid separation (nm) |
|---|---|---|---|---|
| 1 | 5 | — | 85 | 132 |
| 2 | — | 0.02 | 85 | 92 |
| 3 | 5 | 0.05 | 85 | 97 |
| 4 | 10 | 0.05 | 85 | 93 |
| 5 | 5 | 0.01 | 85 | 88 |
| 6 | 10 | 0.01 | 85 | 90 |

The Fourth Embodiment

First, a first solution is formed by a copper sulfate solution. An adequate copper sulfate is provided to form the 250 ml copper sulfate solution with 0.1 mol/liter (mol/L). Next, a second solution is formed by a sodium hypophosphite solution. 20 g of PVP with molecular weight of 58,000 is provided to be dissolved in 150 ml of deionized water. Next, 45 g of the sodium hypophosphite is mixed with the deionized water. The first and second solutions are mixed with each other, and then, the mixed solution is stirred sufficiently. Next, the mixed solution is moved to a thermostatic bath with 80° C. and is reacted in 10 minutes. Then, 150 ml of silver nitrate with the concentration of 0.1 mol/L is gradually mixed with the mixed solution in a fixed quantity. That is, a colloidal nano-Ag/Cu solution is obtained. The average diameter of the colloidal nano-Ag/Cu solution is 96 nm measured by the particle size measurement device (in this embodiment, the particle size measurement device is Malvern (brand name), Zetasizer 3000HS (product name), but is not limited to the above-mentioned device). The colloidal nano-Ag/Cu solution includes not only nano-Ag/Cu particles but also excess unreacted sodium hypophosphite, PVP and dissolved impurities, such as sulfate. Therefore, the impurities must be removed so that the nano-Ag/Cu particles with high purity may be obtained to increase the range of following applications. In this embodiment, in order to achieve the above-mentioned purpose, triethanolamine and polyacrylamide are provided to be main ingredients of each precipitating agent and the ratio, by volume, of the triethanolamine to the polyacrylamide is 2:1 (each kind of the precipitating agents is shown in table 4). The following steps are described as follows. Each of the precipitating agents is dripped down the above-mentioned colloidal nano-Ag/Cu solution, and the colloidal nano-Ag/Cu solution is stirred sufficiently to adjust the pH of the colloidal nano-Ag/Cu solution to 5. After the colloidal nano-Ag/Cu solution is kept stationary for 240 minutes, a supernatant is removed. Then, a precipitate is separated from an agglomeration of the nano-Ag/Cu particles in a precipitating liquid by the vacuum filtration process. In this embodiment, the vacuum filtration is that pumping air out of a flask. After the pressure in the flask is adjusted to the negative pressure, the precipitating agent is dripped on the flask to make the precipitate separate from the precipitating liquid. Next, the precipitate is liquid sprinkled by ethanol. Then, the high-quality nano-Ag/Cu particles are obtained after the precipitate is dried by vacuum drying. The separated nano-Ag/Cu particles may be further dispersed in the ethanol by ultrasonic vibration. The average diameters of the nano-Ag/Cu particles analyzed by the particle size measurement device are shown in Table 4.

TABLE 4

The average diameters of the nano-Ag/Cu particles analyzed by the particle size measurement device.

| example number | weight percent of triethanol-amine (wt. %) | weight percent of poly-acrylamide (wt. %) | average diameter of the nano-Ag/Cu particles before mixing with the precipitating agent (nm) | average diameter of the nano-Ag/Cu particles after performing solid-liquid separation (nm) |
|---|---|---|---|---|
| 1 | 5 | — | 96 | 126 |
| 2 | — | 0.02 | 96 | 101 |
| 3 | 5 | 0.05 | 96 | 108 |
| 4 | 10 | 0.05 | 96 | 112 |
| 5 | 5 | 0.01 | 96 | 103 |
| 6 | 10 | 0.01 | 96 | 105 |

To sum up, according to the above-mentioned method for separating the metal nanoparticles from the colloidal metal solution disclosed in the embodiments, a small amount of the precipitating agent is added to the colloidal metal solution to change the floating stabilization of the colloidal metal solution, which leads to generate a certain amount of agglomeration precipitated through the adhesion, the bridging and the cross-linking reaction with each other. Therefore, the precipitate may be separated by the vacuum filtration.

Moreover, the interactions of the agglomeration between the metal nanoparticles are weak and the agglomeration is soft type, so the metal nanoparticles stirred by the ultrasonic vibrator or the homogenizer are easily dispersed in the colloidal metal solution.

Furthermore, the embodiments disclose the solid-liquid separation method for forming the nano-Ag, nano-Ag/Cu and nano-Cu particles by the wet chemical reduction process, which has advantages of simple processing, easy operation, low equipment requirement, low consumption and stabilized diameters of the nano-Ag, nano-Ag/Cu and nano-Cu particles before and after separation. Therefore, the method is a low-cost, high quality, fast and mass-productive separation method having economic values.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for separating metal nanoparticles from colloidal metal solution, comprising:
providing a colloidal metal solution, including a plurality of metal nanoparticles;
mixing a precipitating agent with the colloidal metal solution for maintaining a pH of the colloidal metal solution in a specific value;
keeping the colloidal metal solution stationary with no external forces applied for a static time at an environmental temperature, such that the metal nanoparticles precipitate from the colloidal metal solution, and the colloidal metal solution forms a supernatant and a precipitating liquid;
separating a precipitate from the precipitating liquid by a filtering process; and
liquid sprinkling the precipitate by a first solvent to obtain the metal nanoparticles,
wherein the precipitating agent is a third solvent including a compound, and the compound is dissolved in the third solvent and is selected from the group consisting of methylamine ($CH_3NH_2$), ethylamine ($CH_3CH_2NH_2$), aminoethanol ($H_2N(CH_2)_2OH$), ethylenediamine ($C_2H_4(NH_2)_2$), dimethylamine (($CH_3)_2NH$), trimethylamine ($N(CH_3)_3$) triethylamine (($C_2H_5)_3N$), propylamine ($C_3H_7NH_7$), isopropylamine, (i-$C_3H_7NH_2$), 1,3-propylenediamine ($NH_2(CH_2)_3NH_2$), 1,2-propylenediamine ($CH_3CH(NH_2CH_2NH_2)$), tripropylamine (($CH_3CH_2CH_2)_3N$), triethanolamine (($HOCH_2CH_2)_3N$), butylamine ($C_4H_9NH_2$), isobutylamine ($C_4H_9NH_2$), tert-butylamine ($C_4H_9NH_2$), n-hexylamine ($H(CH_2)_6NH_2$), n-Octylamine ($H(CH_2)_8NH_2$), benzeneamine ($C_6H_5NH_2$), benzylamine ($C_7H_9N$), pyridine ($C_5H_5N$), polyacrylamide ($[-C_3H_5NO-]_n$), polyacrylic acid ($[-C_3H_4O_2-]_n$), sodium polyacrylate ($[-CH_2-CH(COONa)-]_n$), and combinations thereof.

2. The method according to claim 1, wherein the colloidal metal solution is selected from the group consisting of a colloidal nanosilver (nano-Ag) solution, a colloidal nanosilver/copper (nano-Ag/Cu) solution and a colloidal nanocopper (nano-Cu) solution.

3. The method according to claim 1, wherein the first solvent is selected from the group consisting of water, methanol, ethanol and acetone.

4. The method according to claim 1, wherein the colloidal metal solution is obtained by a wet chemical reduction process, and the wet chemical reduction processes comprises mixing a reduction agent, a surfactant, a pH adjustor and a metal salt with a second solvent.

5. The method according to claim 4, wherein the second solvent is selected from the group consisting of water, methanol, ethanol, propanol, butanol, ethylene glycol and acetone.

6. The method according to claim 4, wherein the reduction agent is selected from the group consisting of formaldehyde (HCHO), sodium hypophosphite ($NaH_2PO_2.H_2O$), hydrazine ($N_2H_4.H_2O$), sodium borohydride ($NaBH_4$), glucose ($C_6H_{12}O_6$), ascorbic acid ($C_6H_8O_6$) and sodium citrate ($C_6H_5O_7Na.2H_2O$).

7. The method according to claim 4, wherein the surfactant is selected from the group consisting of polyvinylpyrrolidone (PVP), sodium dodecyle sulfate (SDS), polyvinyl alcohol (PVA) and cetyltrimethylammonium bromide (CTAB).

8. The method according to claim 4, wherein the pH adjustor is selected from the group consisting of sodium hydroxide, potassium hydroxide, ammonia, sulfuric acid and hydrochloric acid.

9. The method according to claim 4, wherein the metal salt is selected from the group consisting of silver nitrate, silver acetate, copper nitrate, copper sulfate and copper acetate.

10. The method according to claim 1, wherein the third solvent is selected from the group consisting of water, methanol, ethanol, propanol, butanol, ethylene glycol and acetone.

11. The method according to claim 1, wherein the weight percent (wt. %) of the precipitating agent in the colloidal metal solution is between 0.01 and 10.

12. The method according to claim 1, wherein the range of the specific value is between 2 and 6.

13. The method according to claim 1, wherein the range of the pH is between 5 and 5.5.

14. The method according to claim 1, wherein the static time is less than or equal to 48 hours.

15. The method according to claim 1, wherein the range of the environmental temperature is between 15 and 35° C.

16. The method according to claim 1, after the step of forming the supernatant and the precipitating liquid, further comprising removing the supernatant by a decantation process or a suction process.

17. The method according to claim 1, wherein the precipitating agent is used for enabling the metal nanoparticles to form a soft metal-nanoparticle agglomeration layer.

18. The method according to claim 1, wherein the filtering process is to separate the metal nanoparticles by a vacuum filtration or a gravity filtration.

19. The method according to claim 1, wherein the step of liquid blasting sprinkling the precipitate is enabling the first solvent to blast the precipitate to remove a plurality of remained impurities on the precipitate.

20. The method according to claim 1, before the step of obtaining the metal nanoparticles, further comprising drying and powdering the precipitate.

21. The method according to claim 20, wherein the step of drying the precipitate comprises vacuum drying or natural seasoning.

\* \* \* \* \*